United States Patent [19]
Green

[11] Patent Number: 5,199,175
[45] Date of Patent: * Apr. 6, 1993

[54] GAUGE FOR MEASURING THREADS OF VARYING PITCH

[76] Inventor: William P. Green, 3570 E. Lombardy Rd., Pasadena, Calif. 91107

[*] Notice: The portion of the term of this patent subsequent to Jun. 19, 2007 has been disclaimed.

[21] Appl. No.: 522,188

[22] Filed: May 11, 1990

[51] Int. Cl.$^5$ ............................................... G01B 3/36
[52] U.S. Cl. ...................................... 33/199 R; 33/545
[58] Field of Search ................ 33/199 R, 199 B, 829

[56] References Cited
U.S. PATENT DOCUMENTS

| | | |
|---|---|---|
| 1,714,780 | 5/1928 | Hartness . |
| 1,829,797 | 11/1931 | Hartness . |
| 1,875,872 | 9/1932 | Hoke . |
| 1,875,899 | 9/1932 | Thomson . |
| 1,877,307 | 9/1932 | Hartness . |
| 1,905,705 | 4/1925 | Hartness . |
| 2,412,781 | 12/1946 | Parr . |
| 2,556,564 | 6/1951 | Troedson . |
| 2,680,301 | 6/1954 | Steczynski . |
| 2,835,046 | 5/1958 | Gulyban . |
| 2,883,760 | 4/1959 | Ericksson . |
| 3,015,892 | 1/1962 | Stuart . |
| 3,057,072 | 10/1962 | Kohlmeier . |
| 4,213,247 | 6/1980 | Romine . |
| 4,216,585 | 8/1980 | Hatter . |
| 4,417,402 | 11/1983 | Hattan . |
| 4,519,144 | 5/1985 | Larsen . |
| 4,530,158 | 7/1985 | Chauquet . |
| 4,934,059 | 6/1990 | Green ........................... 33/199 R |

OTHER PUBLICATIONS

"The MTG System Of Internal Gaging" published by MTG, Inc. in 1981, pp. 1 through 12.
"Tri-Roll Thread Comparators And Thread Roll Snap Gages" published by Southern Gage Co. Jun., 1979, pp. 1 through 12.

*Primary Examiner*—Harry N. Haroian
*Attorney, Agent, or Firm*—William P. Green

[57] ABSTRACT

A gauge which is constructed to measure a thread of varying pitch, and which includes a threaded gauge element adapted to be screwed into engagement with the thread of varying pitch and to a point at which the threads have a light binding relationship resisting further advancement of the threads together, in combination with a dial indicator adapted to indicate the position at which the binding of the threads occurs as a measurement of the thread of varying pitch. The device may include a second element which is shiftable axially relative to the threaded gauge element to a position limited by engagement with the part containing the thread of varying pitch, with the dial indicator being responsive to and adapted to indicate the relative positioning of the two elements.

21 Claims, 2 Drawing Sheets

GAUGE FOR MEASURING THREADS OF VARYING PITCH

This invention relates to gauges for measuring threads of varying pitch.

BACKGROUND OF THE INVENTION

U.S. Pat. No. 4,842,464 issued Jun. 27, 1989 discloses a type of nut having a thread whose pitch increases gradually and progressively from one end of the nut to its opposite end. Such a thread can improve the distribution of axial load forces between different turns of the thread when the fastener is in use, and can also provide a self-locking action. A currently pending U.S. patent application Ser. No. 07/312,227 filed Feb. 21, 1989 now U.S. Pat. No. 4,934,054 on "Gauging Of Threads Of Varying Pitch" shows gauges for measuring the functional accuracy of such a thread of varying pitch. The gauges disclosed in the drawings of that application include an element having a thread of uniform pitch which is adapted to be screwed into engagement with the thread of varying pitch to a position of light binding engagement therewith, together with means for then indicating the position at which such binding occurs as a measurement of the thread of varying pitch. The device preferably includes a second element threadedly engaging the first element and adjustable axially and rotatively relative thereto into contact with a work part containing the thread of varying pitch, with the relative positioning of the two elements being indicated as a measurement of the thread of the work part.

SUMMARY OF THE INVENTION

The present invention provides a type of gauge which is similar to that of the above discussed copending application but which gives a readout in a different manner, preferably on a dial indicator. As in application Ser. No. 7/312,227, a gauge embodying the invention may include a first threaded element adapted to be screwed into engagement with a varying pitch thread of a work part until the threads reach lightly binding condition, and a second element movable relative to the first mentioned element into engagement with the work part when the threads are in binding engagement. In the gauge of this invention, the second element is preferably mounted for axial sliding movement relative to the first element and toward and away from the work part. The second element may be urged by a spring toward the work part and be manually movable against the force of the spring to a retracted position exposing the thread of the first element for connection of a work part thereto. Such manual retraction may be effected by squeezing two projections on the elements axially toward one another.

The relative axial positioning of the two elements in measuring condition is displayed to a user on a dial indicator, having a body connected to one of the elements and a sensing plunger actuated by the other element. One of the elements may be tubular and disposed slidably about the other element, with the dial indicator being connected into an end of the tubular element.

BRIEF DESCRIPTION OF THE DRAWINGS

The above and other features and objects of the invention will be better understood from the following detailed description of the typical embodiment illustrated in the accompanying drawings, in which.

DESCRIPTION OF THE PREFERRED EMBODIMENT

Figure 1:
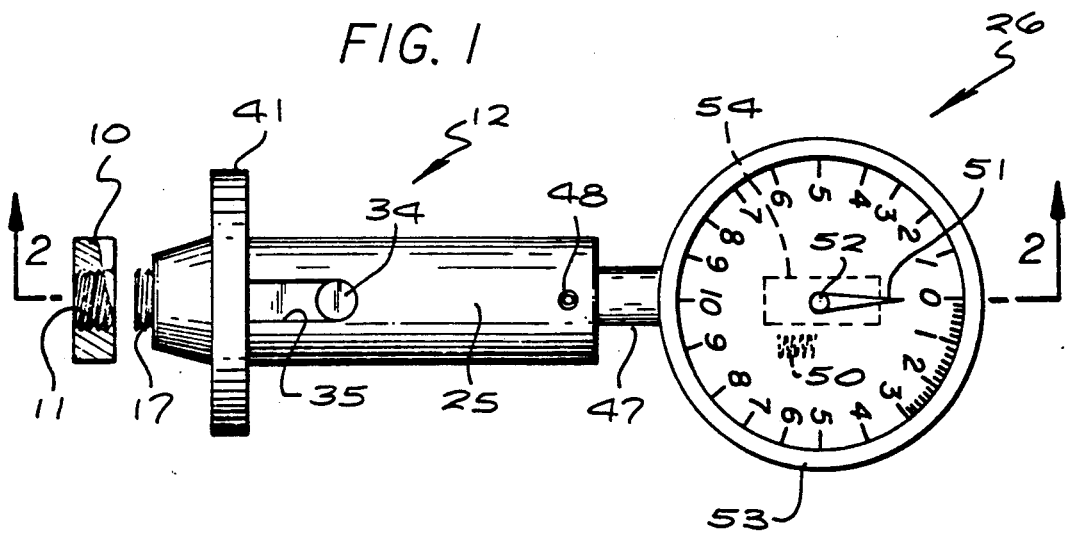
FIG. 1 is a side view of a gauge for measuring an internal thread of varying pitch within a nut or other fastener.
Figure 3:
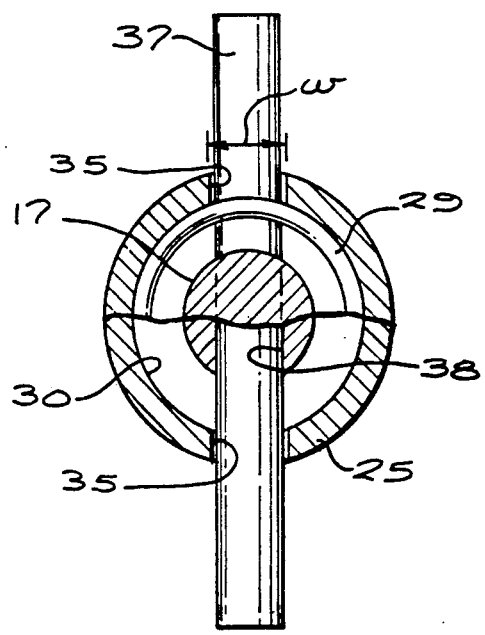
FIG. 3 is a transverse section taken on line 3—3 of FIG. 2.

FIG. 1 illustrates at 10 a nut whose internal thread 11 is to be checked for proper dimensioning by a gauge 12 constructed in accordance with the present invention. The internal thread 11 of the nut may be of the type disclosed in U.S. Pat. No. 4,842,464, with the pitch of the thread increasing progressively and gradually from one of its ends to its opposite end. For example, in FIGS. 1 and 2, it may be assumed that thread 11 has a pitch at its right end 13 corresponding to the pitch of an external thread of a screw with which the nut is to be utilized, and has a slightly greater pitch at its left end 14. The major diameter D and the minor diameter d of thread 11 are both uniform along the entire axial extent of the thread. At the opposite ends of thread 11, nut 10 may have planar end faces 15 and 16 disposed perpendicular to the axis X of the nut and thread.

The gauge 12 for measuring thread 11 of nut 10 includes an element 17 having a very accurately dimensioned and shaped external gauging thread 18 of uniform pitch, uniform major and minor diameters, and uniform thread profile in axial section. The pitch of thread 18 preferably corresponds to the pitch of thread 11 in nut 10 at the right end 13 of the nut. Thread 18 is thus adapted to be screwed into the right end of the nut thread 11 to a limited extent, but because of the varying pitch of the internal thread 11, element 17 and its thread 18 will ultimately bind in thread 11 and resist further advancement. The external thread 18 of element 17 may have the same major and minor diameters as a standard screw with which the nut is to be utilized, or may be slightly undersize with respect to thread 11, with both the major and minor diameters of the external thread 18 being sufficiently less than the major and minor diameters respectively of internal thread 11 to allow element 17 to be screwed into the internal thread 11 through a substantial distance. However, the relationship between the threads is such that they will reach a lightly binding condition before thread 18 has reached the left end 14 of thread 11. For example, the binding relationship may typically be attained in a position of the parts such as that represented in FIG. 4. The object of the gauge 12 is to measure how far element 17 can be screwed axially into nut 10 before binding occurs, and use this measurement as a determination of whether the internal thread of the nut is dimensioned properly.

Thread 18 of element 17 is preferably a standard 60 degree thread, having flank surfaces at its opposite sides which, as viewed in axial section, are disposed at an angle of 60 degrees to one another, and typically also having short axially extending crest and root surfaces at 19 and 20 defining the major and minor diameters of the thread. The internal thread 11 of the nut may have essentially the same 60 degree profile in axial section, with the groove between successive turns of thread 11 preferably increasing gradually in width as taught in U.S. Pat. No. 4,842,464 to attain the discussed progressive increase in pitch of thread 18. Alternatively, the groove may be of uniform width and the thread be of gradually increasing axial thickness as taught in a variational form of the fastener of the mentioned patent.

Figure 2:
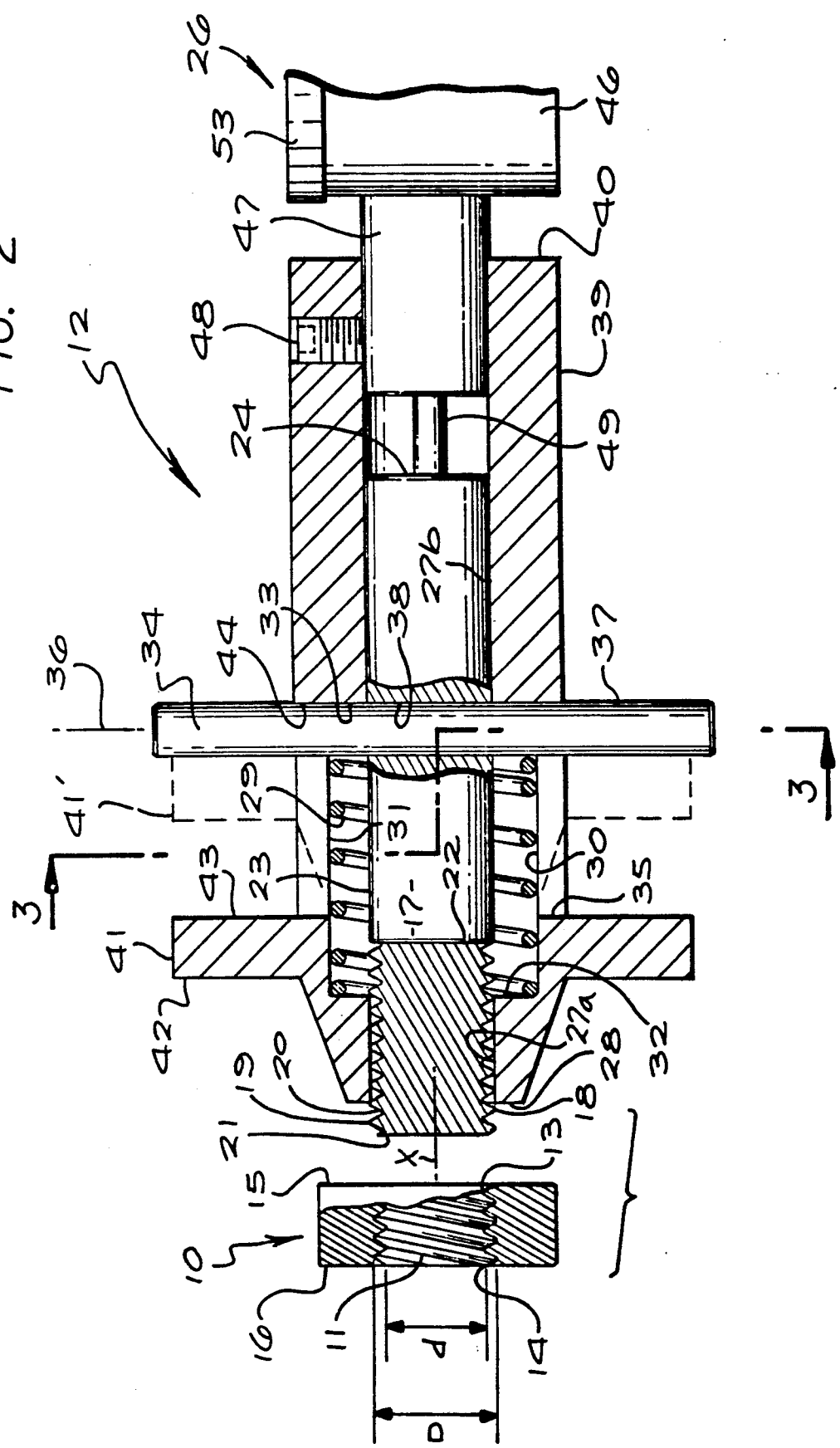
FIG. 2 is an enlarged axial section taken on line 2—2 of FIG. 1.

At its left end as viewed in FIGS. 1 and 2, element 17 may have a planar end face 21 disposed transversely of axis X of the threads. Thread 18 extends rightwardly from the location of end face 21 to a location 22. Beyond that location, element 17 has an external surface 23 which is cylindrical about axis X and which continues to the location of a planar right end surface 24 of the element extending perpendicular to axis X. Surface 23 is desirably of a diameter corresponding to that of the major diameter crest surfaces 19 of thread 18.

Figure 4:
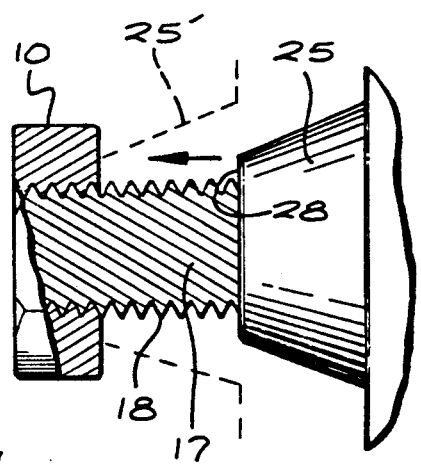
FIG. 4 is a fragmentary axial section showing the threaded element of the gauge screwed into the nut being measured to a position of light binding engagement therewith.

A tubular element 25 extending about the threaded element 17 is essentially annular about axis X, and is slidable axially relative to element 17 as between the extended position represented in FIGS. 1 and 2 and a retracted position shown in broken lines in FIG. 2 and full lines in FIG. 4. The relative axial position of elements 17 and 25 during a thread measuring operation is indicated to a user by a dial indicator 26 connected to the right end of element 25.

To mount and guide element 25 for such sliding movement, element 25 has aligned and coaxial internal cylindrical surfaces 27a and 27b centered about axis X and of a diameter fitting closely but slidably about surfaces 19 and 23 of element 17. Surface 27a is formed in the left end portion of element 25, and in the FIG. 2 position fits closely about and slidably engages the major diameter crest surfaces 19 of thread 18, while surface 27b near the right end of element 25 is of the same diameter as surface 27a and fits closely about and slidably engages surface 23.

At its left end, element 25 has a preferably planar end face 28 which is annular about axis X and extends radially outwardly from the end of surface 27a, and which is perpendicular to axis X. Surface 28 is engageable against the right end face 15 of nut 10 to limit leftward movement of element 25 relative to element 17 during measurement of a thread in nut 10. Element 25 is yieldingly urged leftwardly relative to element 17 toward the full line position of FIGS. 1 and 2 by a coil spring 29 which is centered about axis X and located within an annular internal recess 30 formed in element 25 axially between surfaces 27a and 27b. Recess 30 may be defined by a cylindrical internal surface 31 formed in element 25 and centered about axis X and two annular end surfaces 32 and 33 perpendicular to axis X.

The relative axial movement of elements 17 and 25 is limited by a pin 34 which is connected rigidly to element 17 and extends radially outwardly through axially elongated slots 35 formed in opposite sides of the tubular side wall of element 25. Pin 34 may be cylindrical about an axis 36 disposed perpendicular to and intersecting axis X. The cylindrical surface 37 of pin 34 may be a tight friction fit within a transverse cylindrical passage 38 in element 17 to secure the pin rigidly to element 17. Slots 35 are elongated in a direction parallel to axis X, and have a width w just slightly greater than the diameter of cylindrical pin 34 to retain elements 17 and 25 against relative rotation about axis X.

Element 25 has an external surface 39 which is cylindrical about axis X between an annular transverse right end surface 40 of the element and a flange 41 formed on element 25 near its left end. Flange 41 may be annular about axis X and projects radially outwardly beyond the diameter of surface 39 and preferably perpendicular to axis X. The flange may be defined at its opposite sides by two planar parllel surfaces 42 and 43 perpendicular to axis X.

In the full line condition of FIGS. 1 and 2, spring 29 urges element 25 leftwardly relative to element 17 to a position limited by engagement of pin 34 with the right end surfaces 44 of slots 35 and with the end wall 33 of recess 30. Element 25 may be retracted relative to element 17 to the position illustrated in broken lines in FIG. 2 and in full lines in FIG. 4 by manually moving flange 41 and pin 34 axially together. For example, a user may engage his thumb against the left side of flange 41 and his first and second fingers against the exposed ends of pin 34 and then squeeze the flange toward the pin to the broken line position 41' of the flange in FIG. 2, in which position the flange engages the pin.

Dial indicator 26 may be of known conventional construction, having a body 46 with a cylindrical portion 47 which is a close fit within the right end portion of internal surface 27b of element 25, and is adapted to be rigidly retained in fixed position within element 25 by a set screw 48 connected threadedly to element 25 and tightenable against portion 47 of the body of the dial indicator. A sensing plunger 49 of the dial indicator is slidably movable along axis X within and relative to portion 47 of the dial indicator body and engages surface 24 to follow movements thereof. A spring diagrammatically represented at 50 within the indicator yieldingly urges plunger 49 leftwardly against surface 24. A pointer 51 of the indicator is rotated about an axis 52 relative to the body 46 and a circular dial 53 by a mechanism represented diagrammatically at 54 which converts axial motion of plunger 49 to rotary motion of the pointer. In accordance with conventional practice, dial 53 may be rotatably adjustable relative to the body of the indicator and pointer 51 to calibrate the device to a desired zero setting.

In using the illustrated gauge to measure the internal thread within a variable pitch nut such as that shown in FIG. 1, a user may grasp the gauge in one hand and squeeze flange 41 and pin 34 axially together as discussed to the condition represented in broken lines in FIG. 2 and in full lines in FIG. 4, after which the user may screw the nut onto the exposed end of thread 18 of element 17 to a position in which threads 18 and 11 are in light binding engagement. Such a position is illustrated in FIG. 4. Flange 41 and pin 34 are then released to enable movement of element 25 relative to element 17 by spring 29 to the broken line position 25' of FIG. 4 in which leftward movement of element 25 is limited by engagement with the nut. This relative axial setting of elements 25 and 17 determines the position of plunger 49 of the dial indicator relative to the body of the indicator and determines the rotary position of pointer 51 relative to dial 53, thereby giving a reading on the dial representing the dimensioning of thread 11 of the nut. The reading thus produced is compared with a corresponding reading given when the gauge is utilized in the same way in connection with a master thread of precisely known measurement, to indicate the accuracy of the manufactured nut.

While a certain specific embodiment of the present invention has been disclosed as typical, the invention is of course not limited to this particular form, but rather is applicable broadly to all such variations as fall within the scope of the appended claims.

I claim:

1. A gauge for measuring a thread of varying pitch formed on a work part, said gauge comprising:
an element having a thread adapted to be screwed along an axis into engagement with said thread of varying pitch and to a position at which binding of the threads offers resistance to further advancement of the threads together; and
a dial indicator operable to indicate the position at which said binding of the threads occurs as a measurement of said thread of varying pitch.

2. A gauge as recited in claim 1, including a second element which is movable axially relative to said first mentioned element and said thread thereof to a position limited by said work part when said threads are in binding engagement, said dial indicator being operable to indicate the position of said second element relative to said first mentioned element as said measurement of said thread of varying pitch.

3. A gauge as recited in claim 2, including means yieldingly urging said second element in a predetermined axial direction relative to said first element.

4. A gauge as recited in claim 2, including means for manually actuating said elements axially relative to one another.

5. A gauge as recited in claim 3, including means for manually actuating said second element in an opposite axial direction relative to said first element.

6. A gauge as recited in claim 3, including a flange on one of said elements and a projection on the other element adapted to be manually pressed together to manually actuate said elements in an opposite axial direction relative to one another.

7. A gauge as recited in claim 2, in which said dial indicator includes a body connected to one of said elements and a sensing member actuable by the other element to produce a display indicating the position at which binding of the threads occurs as a measurement of said thread of varying pitch.

8. A gauge for measuring a thread of varying pitch formed on a work part, said gauge comprising:
an element having a thread adapted to be screwed along an axis into engagement with said thread of varying pitch and to a position at which binding of the threads offers resistance to further advancement of the threads together;
a second element which is movable slidably relative to said first mentioned element and said thread thereof to a position limited by said work part when said threads are in binding engagement, and
means for then indicating the position of said second element relative to said first mentioned element as a measurement of said thread of the work part.

9. A gauge as recited in claim 8, including means yieldingly urging said second element in one axial direction relative to the first element.

10. A gauge as recited in claim 8, including a spring yieldingly urging said second element in an axial direction toward said work part.

11. A gauge as recited in claim 8, including means for manually actuating said second element in a predetermined axial direction relative to said first element.

12. A gauge as recited in claim 8, including a spring yieldingly urging said second element in a first direction relative to said first element axially toward said work part, and means for manually actuating said second element in an opposite direction relative to said first element to a retracted position.

13. A gauge as recited in claim 8, including a coil spring contained within an internal recess in said second element and about said first element and yieldingly urging said second element in a predetermined axial direction relative to said first element and toward said work part.

14. A gauge as recited in claim 13, including a projection attached to said first element and slidably received within a slot in said second element.

15. A gauge as recited in claim 13, including a pin attached to said first element and having opposite ends slidably received within slots formed in opposite sides of said second element and projecting radially outwardly beyond said opposite sides of said second element to form two handles for manually actuating said first element axially relative to said second element.

16. A gauge as recited in claim 8, including projections on said elements manually actuable relative to one another to shift said second element axially relative to said first element.

17. A gauge as recited in claim 8, including a projection extending outwardly from said first element through a slot in said second element and forming a first handle projection outwardly beyond said second element; said first element having a flange forming a second handle projection manually actuable toward and away from said first handle projection to shift said elements relative to one another.

18. A gauge as recited in claim 17, including a spring urging said elements to a retracted position relative to one another.

19. A gauge for measuring an internal thread of varying pitch formed in a work part, said gauge comprising:
an element having an external thread which is centered about an axis and is adapted to be screwed into engagement with said thread of varying pitch by rotation of one of said threads about said axis relative to the other thread, and to a position at which binding of the threads offers resistance to further advancement of the threads together;
a second element disposed about said first element and movable slidably relative thereto parallel to said axis and to a position limited by said work part when said threads are in binding engagement; and
a dial indicator having a body connected to one of said elements and a sensing member actuable by the other element to produce a display on said indicator indicating the position at which binding of the threads occurs as a measurement of said thread of varying pitch.

20. A gauge as recited in claim 19, including a spring yieldingly urging said second element axially relative to said first element in a direction toward said work part, and means on said elements manually actuable to move said second element in an opposite axial direction relative to said first element.

21. A gauge as recited in claim 19, including a coil spring contained within an internal recess in said second element and about said first element and urging said second element axially relative to said first element in a direction toward the work part, a handle flange formed on said second element, and a pin attached to said first element and projecting radially outwardly therefrom through at least one slot in said second element and forming at least one handle projection therebeyond and manually actuable toward said flange to move said elements against the force of said spring to a retracted position.

* * * * *